United States Patent
Suzuki

(10) Patent No.: US 8,976,418 B2
(45) Date of Patent: Mar. 10, 2015

(54) IMAGE PROCESSING APPARATUS FOR DETERMINING A X COORDINATE VALUE OF AN EDGE ON A CURRENT SCAN LINE FROM AMONG A PLURALITY OF X COORDINATE VALUES

(71) Applicant: Canon Kabushiki Kaisha, Tokyo (JP)

(72) Inventor: Shintarou Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 13/706,229

(22) Filed: Dec. 5, 2012

(65) Prior Publication Data

US 2013/0148169 A1  Jun. 13, 2013

(30) Foreign Application Priority Data

Dec. 7, 2011  (JP) ................................. 2011-268272

(51) Int. Cl.
| | |
|---|---|
| H04N 1/40 | (2006.01) |
| G06K 15/02 | (2006.01) |
| G06T 11/40 | (2006.01) |
| B41J 2/34 | (2006.01) |
| G03G 15/04 | (2006.01) |
| G06F 3/12 | (2006.01) |

(52) U.S. Cl.
CPC .......... *G06K 15/1822* (2013.01); *G06K 15/181* (2013.01); *G06T 11/40* (2013.01); *G06F 3/1213* (2013.01); *G06F 3/122* (2013.01); *G06F 3/1244* (2013.01); *G06F 3/1279* (2013.01)
USPC ............ 358/3.24; 358/2.1; 347/201; 399/187

(58) Field of Classification Search
None
See application file for complete search history.

(56) References Cited

U.S. PATENT DOCUMENTS

| | | | | |
|---|---|---|---|---|
| 5,561,534 | A * | 10/1996 | Ishida et al. ................... | 358/448 |
| 8,699,749 | B2 * | 4/2014 | Osako ............................ | 382/103 |
| 2006/0115157 | A1 * | 6/2006 | Mori et al. ..................... | 382/190 |
| 2010/0302564 | A1 * | 12/2010 | Ozawa ........................... | 358/1.9 |

FOREIGN PATENT DOCUMENTS

JP  2003-216960 A  7/2003

* cited by examiner

*Primary Examiner* — Steven Kau
(74) *Attorney, Agent, or Firm* — Canon USA, Inc., IP Division

(57) ABSTRACT

An image forming apparatus determines, with respect to intermediate data including a start edge and an end edge indicating a shape of an object and which do not intersect and where an edge direction of the start edge and an edge direction of the end edge are aligned, whether an edge read from the intermediate data is the start edge or the end edge based on an edge direction of the edge, determines an X coordinate of an edge to be determined for each scan line as a minimum value of a corresponding scan line, and determines, an X coordinate of an edge to be determined for each scan line, as a maximum value of a corresponding scan line.

9 Claims, 18 Drawing Sheets

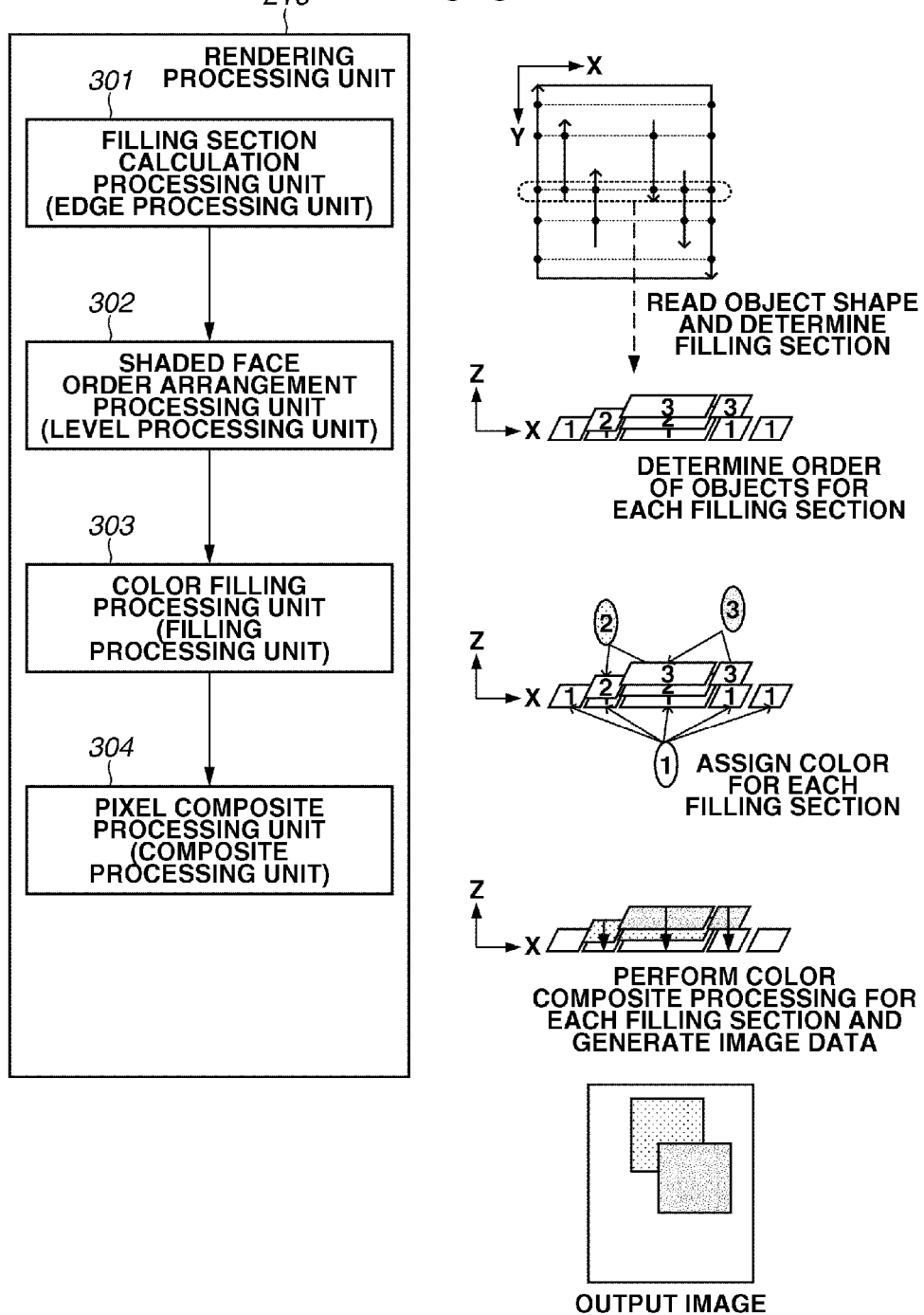

| | INTERMEDIATE DATA | | |
|---|---|---|---|
| | EDGE DATA | | |
| | PS EDGE | PS EDGE | |
| Y=Y2 | STARTING X COORDINATE = X_2 | STARTING X COORDINATE = X_2 | ----- |
| | UPWARD | DOWNWARD | |
| | CLOCKWISE | CLOCKWISE | |
| | (Dx_1, Dy_1) | (Dx_2, Dy_2) | |
| | (Dx_6, Dy_6) | (Dx_3, Dy_3) | |
| | (Dx_5, Dy_5) | (Dx_4, Dy_4) | |
| | EndOfSegment | EndOfSegment | |

FIG.7B

DATA STRUCTURE OF EDGE NODE

| |
|---|
| POINTER TO NEXT EDGE NODE: NextEdge |
| POINTER TO PREVIOUS EDGE NODE: PrevEdge |
| CURRENT X COORDINATE: CurrentX |
| EDGE DIRECTION: UpDown |

FIG.7C

DATA STRUCTURE OF UPDATE NODE OF PS EDGE

| |
|---|
| POINTER TO CORRESPONDING EDGE NODE: EdgetPtr |
| POINTER TO NEXT EDGE NODE: NextPtr |
| ACTUAL X COORDINATE: ReX |
| NUMBER OF REMAINING SCAN LINES: RemainY |
| FRACTIONAL PORTION OF Y COORDINATE: OffsetY |
| END DETECTION FLAG OF SEGMENT DATA: FinishFlag |
| AMOUNT OF TRAVEL IN X DIRECTION: Dx |
| AMOUNT OF TRAVEL IN Y DIRECTION: Dy |
| POINTER TO SEGMENT DATA: SegPtr |
| ROTATION DIRECTION OF EDGE: Clock |

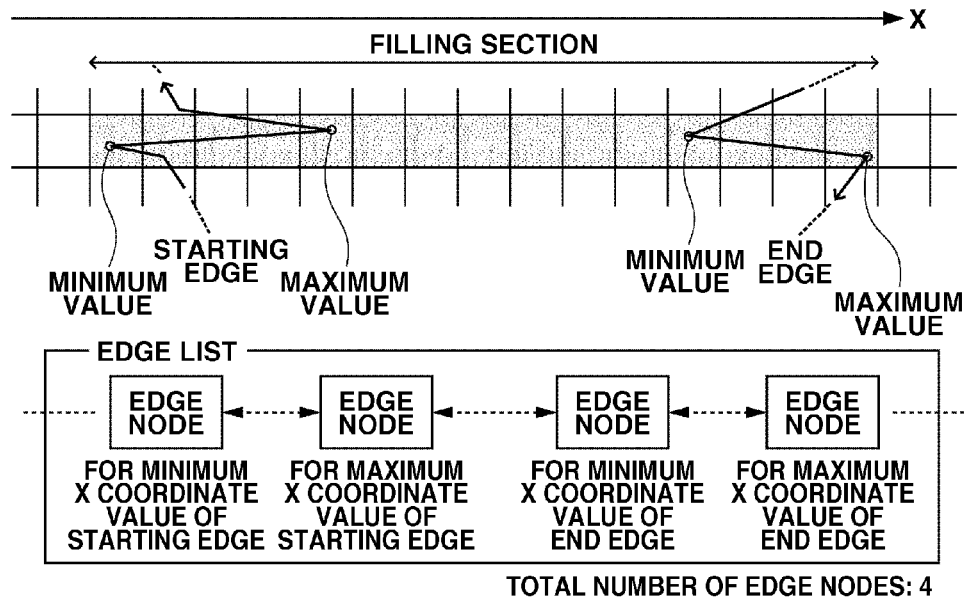
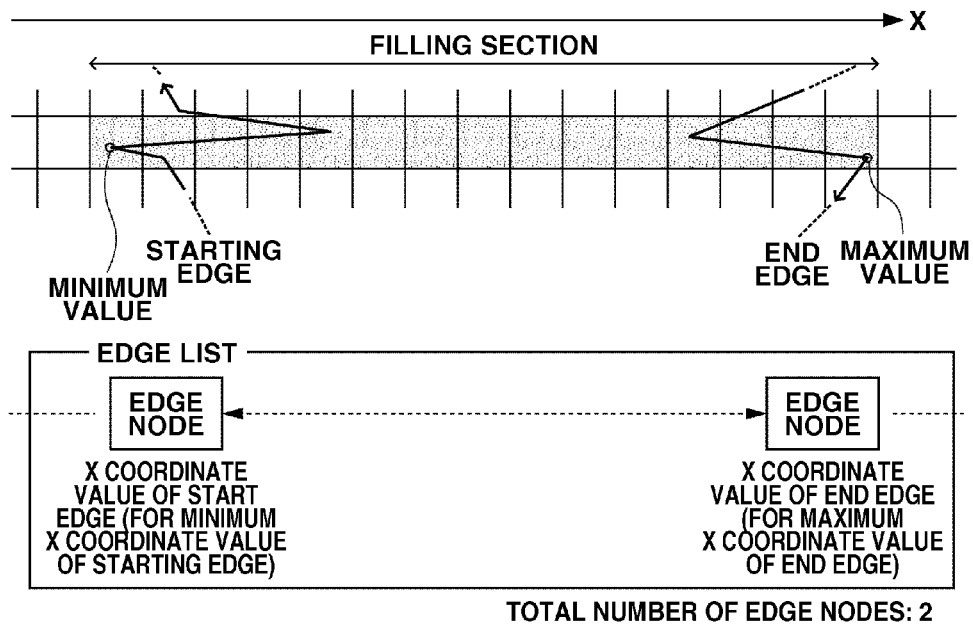

IMAGE PROCESSING APPARATUS FOR DETERMINING A X COORDINATE VALUE OF AN EDGE ON A CURRENT SCAN LINE FROM AMONG A PLURALITY OF X COORDINATE VALUES

BACKGROUND OF THE INVENTION

1. Field of the Invention

The present invention relates to an image forming apparatus, an information processing method, and a computer-readable medium.

2. Description of the Related Art

Conventionally, when PostScript (PS) data in a real number coordinate system is directly submitted to a printer not via a driver, an output result with high fidelity to the original PS data can be obtained. As a method for obtaining such an output result, Japanese Patent Application Laid-Open No. 2003-216960 discusses a method using a format called PS edge. When PS data is recognized on the printer side, an object in the PS data is included as intermediate data in a dedicated edge format (PS edge). Then, a rendering processing unit performs edge processing dedicated to the PS edge. As a result, high fidelity output result is obtained.

The edge processing dedicated to this PS edge adds one supplemental edge to one PS edge in the rendering processing unit so that two X coordinates (maximum and minimum coordinates) can be used. In this manner, a change in coordinates of an edge in one scan line can be accurately obtained. Thus, the user can obtain a print result of the PS data similar to the result displayed by the application on the host personal computer (PC).

According to the conventional technique, one additional edge is internally generated for each PS edge. Thus, the number of edges is increased and, further, the number of levels is increased due to the increase in the number of edges.

According to the increase in the numbers of edges and levels, the load of the edge processing and the level processing performed by the rendering processing unit is increased. Thus, when a graphic art including large quantities of fine thin lines in PS data is submitted to the printer, the load regarding the edge processing and the level processing performed by the rendering processing unit is increased whereas the image forming performance is reduced.

SUMMARY OF THE INVENTION

The present invention is directed to preventing performance reduction in image forming.

According to an aspect of the present invention, an image forming apparatus includes a determination unit configured to determine, with respect to intermediate data including a start edge and an end edge indicating a shape of an object and which do not intersect and where an edge direction of the start edge and an edge direction of the end edge are aligned, whether an edge read from the intermediate data is the start edge or the end edge based on an edge direction of the edge, a starting coordinate determination unit configured to determine, in a case where the edge is determined as the start edge by the determination unit, an X coordinate of an edge to be determined for each scan line, as a minimum value of a corresponding scan line, and an end coordinate determination unit configured to determine, in a case where the edge is determined as the end edge by the determination unit, an X coordinate of an edge to be determined for each scan line, as a maximum value of a corresponding scan line.

According to another aspect of the present invention, reduction in performance of image forming can be prevented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a rendering processing unit.

FIG. 7B illustrates an example of a data structure of an edge node.

FIG. 7C illustrates an example of a data structure of an update node of a PS edge.

FIG. 16A illustrates a portion of a data structure of a conventional PS edge.

FIG. 16B illustrates a portion of a data structure of a PS edge.

DESCRIPTION OF THE EMBODIMENTS

Various exemplary embodiments, features, and aspects of the invention will be described in detail below with reference to the drawings.

Figure 1:
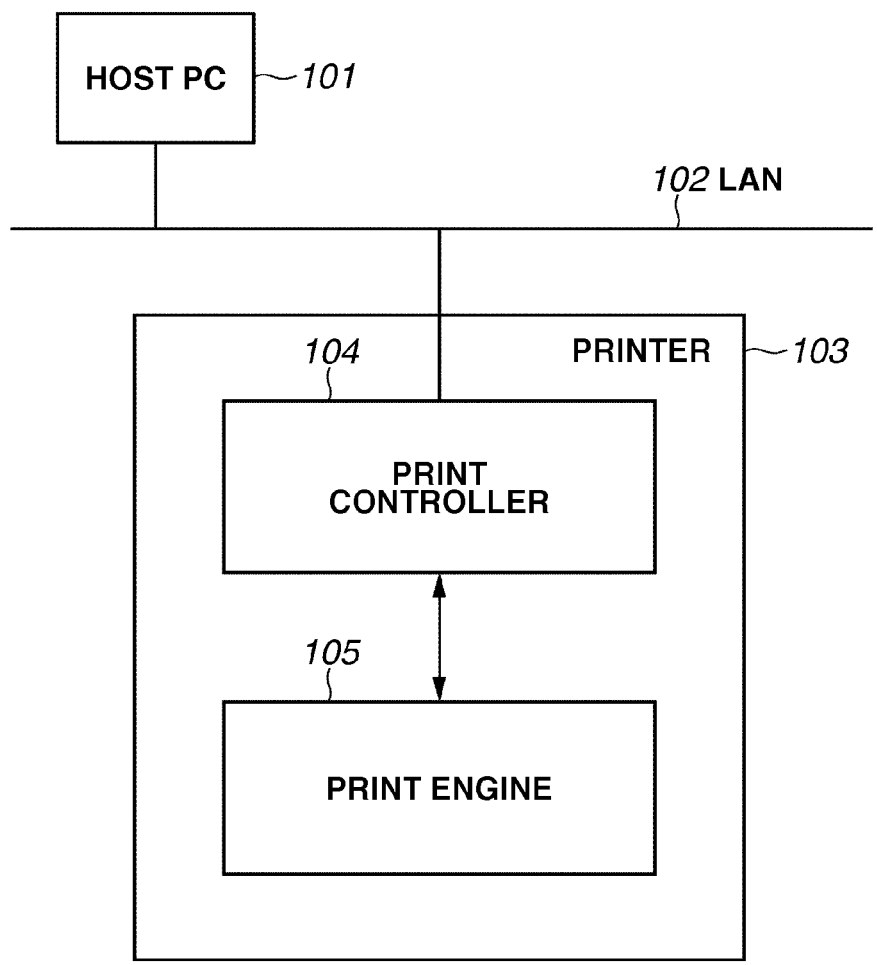
FIG. 1 illustrates an example of a configuration of a print system.

FIG. 1 illustrates an example of a configuration of a print system.

The print system includes a host PC 101, a local area network (LAN) 102, and a printer 103. A user of the print system sends out a print instruction to the printer 103 from the host PC 101 via the LAN 102. The printer 103 includes a print controller 104 and a print engine 105. The print instruction sent from the host PC 101 via the LAN 102 is transmitted to the print controller 104. The print controller 104 forms image data according to the print instruction and transmits the image data to the print engine 105. The print engine 105 prints the image data on a paper medium.

Figure 2:
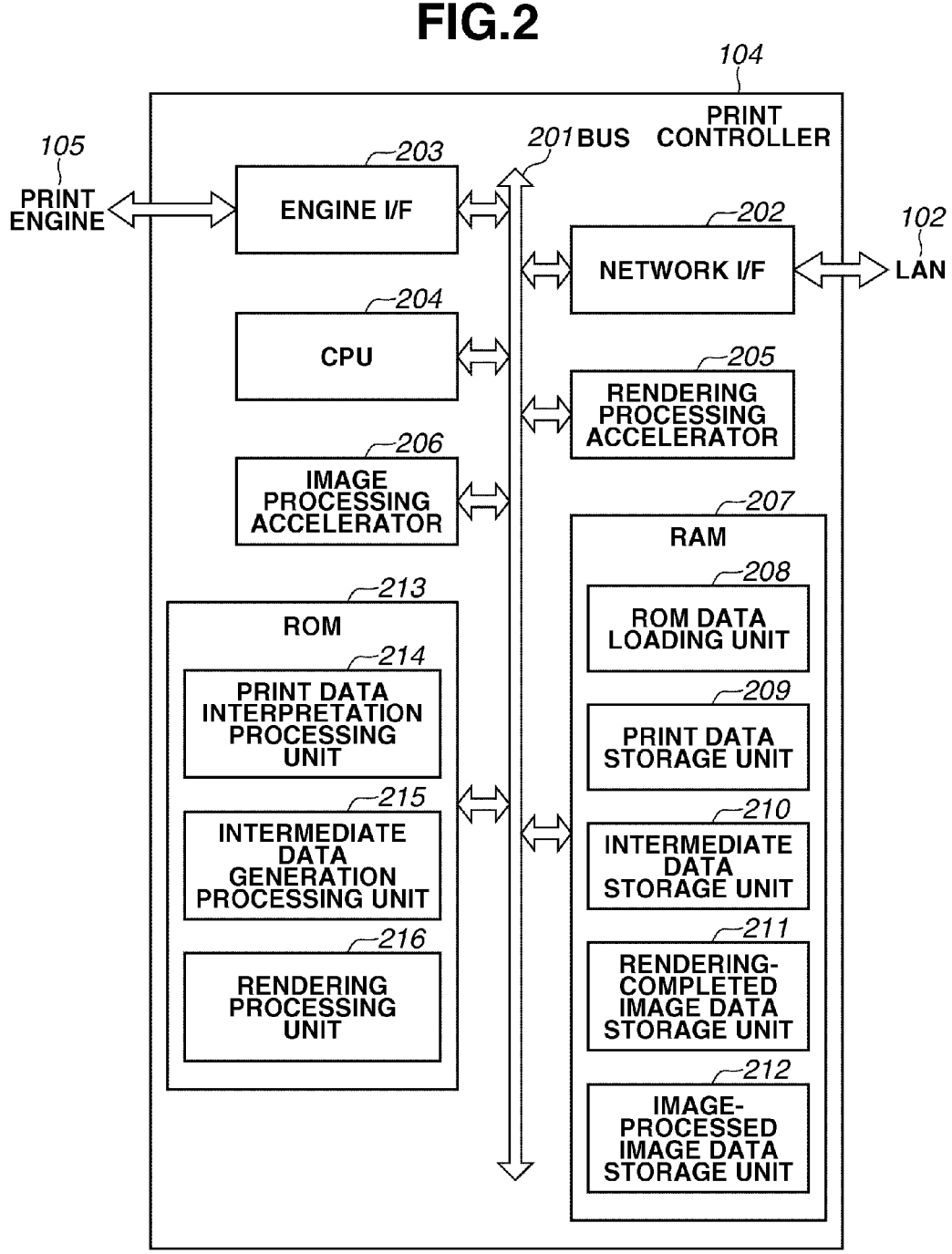
FIG. 2 illustrates an example of a print controller.

FIG. 2 illustrates an example of the print controller 104.

A bus 201 is used for data transmission in the controller. A network interface (I/F) 202 is an interface of the print controller 104 and the network. Via the network I/F 202, the print controller 104 can receive data transmitted from the host PC 101 via the LAN 102. An engine I/F 203 is an interface between the print controller 104 and the print engine 105. Image data generated by the print controller 104 is transmitted to the print engine 105 via an engine I/F.

A central processing unit (CPU) 204 executes read-only memory (ROM) data loaded into a ROM data loading unit 208. A rendering processing accelerator 205 performs rendering processing. The rendering processing accelerator 205 can be either rendering processing dedicated hardware or a general purpose CPU different from the CPU 204. If a rendering processing unit 216 is loaded into the ROM data loading unit 208 having a general purpose CPU as the rendering processing accelerator 205, it is executed by the rendering processing accelerator 205. Further, if the rendering processing accelerator 205 does not exist, the rendering processing unit 216 is executed by the CPU 204. The rendering processing accelerator 205 is hardware dedicated to image processing.

A random access memory (RAM) 207 is divided into regions corresponding to the ROM data loading unit 208, a print data storage unit 209, an intermediate data storage unit 210, a rendering-completed image data storage unit 211, and an image-processed image data storage unit 212.

A ROM 213 stores a print data interpretation processing unit 214, an intermediate data generation processing unit 215, and the rendering processing unit 216. Print data received via the network I/F 202 is stored in the print data storage unit 209. The print data stored in the print data storage unit 209 has its page description language (PDL) type identified by the print data interpretation processing unit 214 and interpreted as a rendering instruction based on an interpretation method of each PDL type. The rendering instruction is transmitted to the intermediate data generation processing unit 215. Based on the rendering instruction, the intermediate data generation processing unit 215 generates the intermediate data and stores it in the intermediate data storage unit 210. The rendering processing unit 216 (the rendering processing accelerator 205 if the rendering processing accelerator 205 is dedicated hardware) performs rendering of the image data according to the intermediate data stored in the intermediate data storage unit 210. The rendering-completed image data is stored in the rendering-completed image data storage unit 211.

The rendering processing accelerator 205 performs image processing of the image data stored in the rendering-completed image data storage unit 211 and stores the image-processed image data in the image-processed image data storage unit 212. The image-processed image data is read by the print engine 105 via the engine I/F 203. The print engine 105 prints the obtained image data on a paper medium and discharges the printed paper medium.

FIG. 3 illustrates an example of the rendering processing unit 216.

The rendering processing unit 216 includes an edge processing unit 301, a level processing unit 302, a filling processing unit 303, and a compositing processing unit 304. The edge processing unit 301 reads the intermediate data stored in the intermediate data storage unit 210, calculates the X coordinate of the edge (outline) of the object at each Y coordinate, and transmits spans, which are sections between edges, to the level processing unit 302. The level processing unit 302 performs arrangement processing so that spans received from the edge processing unit 301 are overlapped in correct order (descending order of level numbers) with respect to the sheet surface. When the arrangement processing is finished, the level processing unit 302 transmits the level number of the foremost span to the filling processing unit 303 in span units.

The filling processing unit 303 performs assignment (filling) processing of color information linked to the level of each span received from the level processing unit 302. The span having the filling processing completed by the filling processing unit 303 is transmitted to the compositing processing unit 304. The compositing processing unit 304 performs compositing processing with respect to each pixel of the span received from the filling processing unit 303.

There are two methods used for the compositing processing. One uses raster operator (ROP) and another uses alpha blend. The ROP calculates a pixel to be output by logical operation for each color value of the pixels of the spans that overlap with each other. The alpha blend is a method for blending color values of pixels of the overlapping spans according to a certain ratio ($\alpha$ channel) designated by the intermediate data. The output pixel calculated by the compositing processing unit 304 is transmitted to and stored in the rendering-completed image data storage unit 211. Even if the rendering processing accelerator 205 is dedicated hardware, the content of the processing is not changed.

FIGS. 4A to 4D illustrate the generation of the PS edge based on the sequence of the coordinate points of the object which the intermediate data generation processing unit 215 received from the print data interpretation processing unit 214 after the PDL type of the print data is determined as PS by the print data interpretation processing unit 214.

Figure 4A:
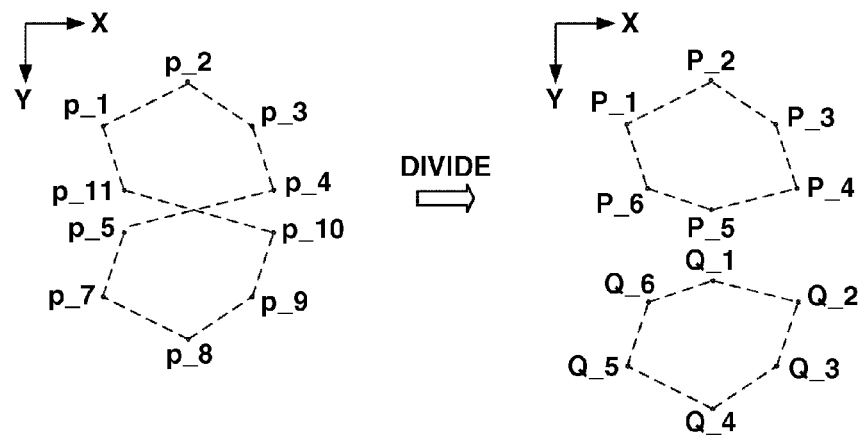
FIG. 4A illustrates information processing used for simplifying the graphic of an object performed by a print data interpretation processing unit after data interpretation so that load after intermediate data generation processing can be reduced.

FIG. 4A illustrates information processing used for changing an object into simple graphics after the data is interpreted by the print data interpretation processing unit 214. This processing is performed to reduce the processing load after the intermediate data generation processing. The print data interpretation processing unit 214 checks the coordinate points of the object and divides the object into graphics without an intersection. Then, the graphics obtained by the division are transmitted to the intermediate data generation processing unit 215.

Figure 4B:
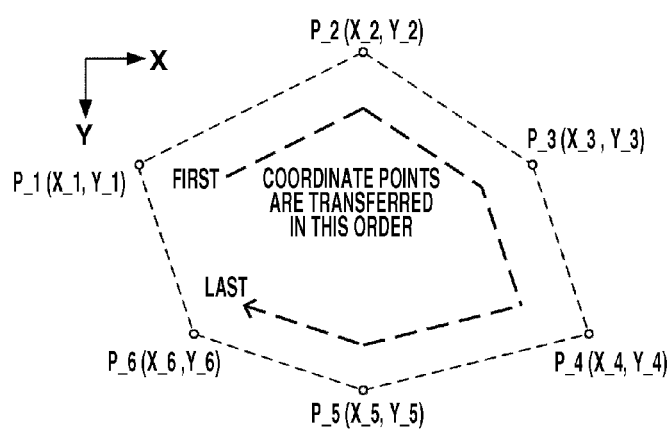
FIG. 4B illustrates a sequence of coordinate points received by an intermediate data generation processing unit.

FIG. 4B illustrates the sequence of the coordinate points received by the intermediate data generation processing unit 215. In FIG. 4B, the intermediate data generation processing unit 215 receives a coordinate point P_1 first, and then receives coordinate points P_2, P_3, P_4, P_5, and P_6 in the order the shape of the object is rendered.

Figure 4C:
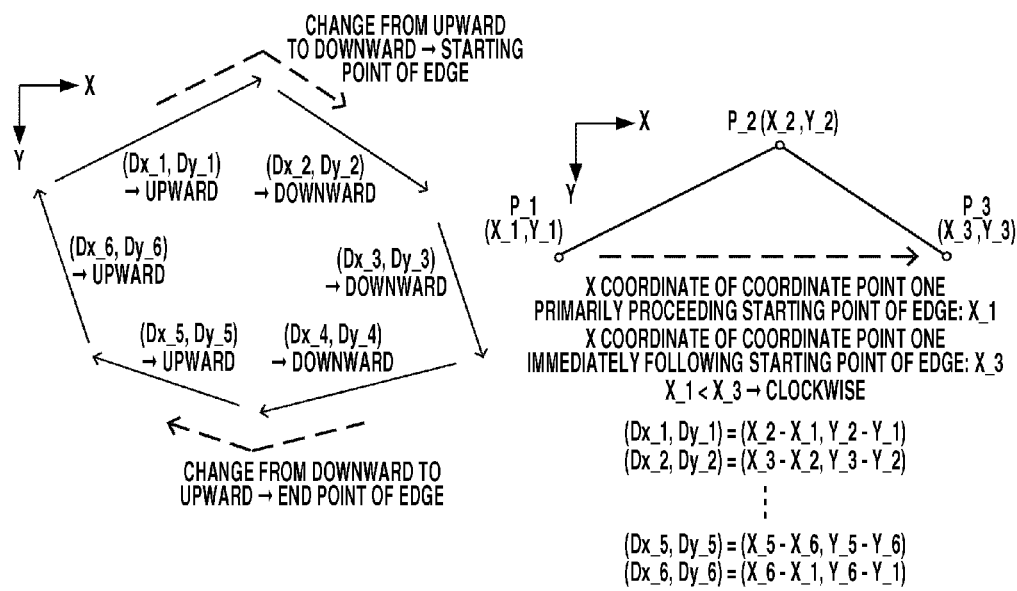
FIG. 4C illustrates generation of edge data.

FIG. 4C illustrates how the edge data is generated. The intermediate data generation processing unit 215 calculates the travel amount of the coordinate of the received coordinate points. Then, the intermediate data generation processing unit 215 determines that the coordinate point whose travel amount in the Y direction is changed from minus (upward) to plus (downward) as a starting coordinate of the edge since it has a minimum value in the Y direction. On the other hand, the intermediate data generation processing unit 215 determines that the coordinate point whose travel amount in the Y direction is changed from plus (downward) to minus (upward) as an end coordinate of the edge since it has a maximum value in the Y direction.

According to the example in FIGS. 4B and 4C, the starting coordinate of the edge is the coordinate point P_2 and the end coordinate is the coordinate point P_5. Further, the intermediate data generation processing unit 215 compares a magnitude relation of the coordinates which have been transmitted before and after the starting coordinate. In other words, the intermediate data generation processing unit 215 compares the magnitude relation of the coordinates in the X direction and determines that the coordinate points have been transmitted in the clockwise order if the X coordinate of the coordinate after the starting coordinate is greater and determines that the coordinate points have been transmitted in the counterclockwise order if the X coordinate of the coordinate after the starting coordinate is smaller. According to the example in FIG. 4C, the intermediate data generation processing unit 215 compares the magnitude relation of the X coordinates of the coordinate point P_1 and the coordinate point P_3, which are the coordinate points before and after the starting coordinate point P_2. Since, X_1<X_3, it is determined that the coordinate points have been transmitted in the clockwise order.

Figure 4D:
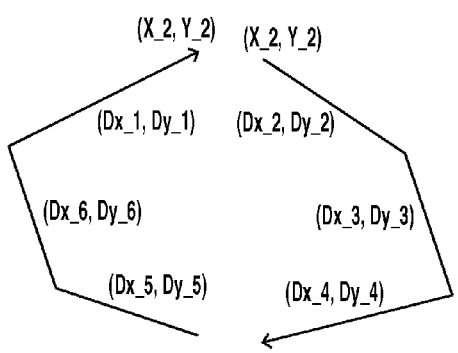
FIG. 4D illustrates edge data.

FIG. 4D illustrates the edge data. Although a detailed data format of the edge data stored in the intermediate data is described below, the edge data stored in the intermediate data includes starting coordinates of the edge, the travel amount of the coordinates to the end coordinates, edge type, edge direction, and clockwise/counterclockwise information.

Figure 5:
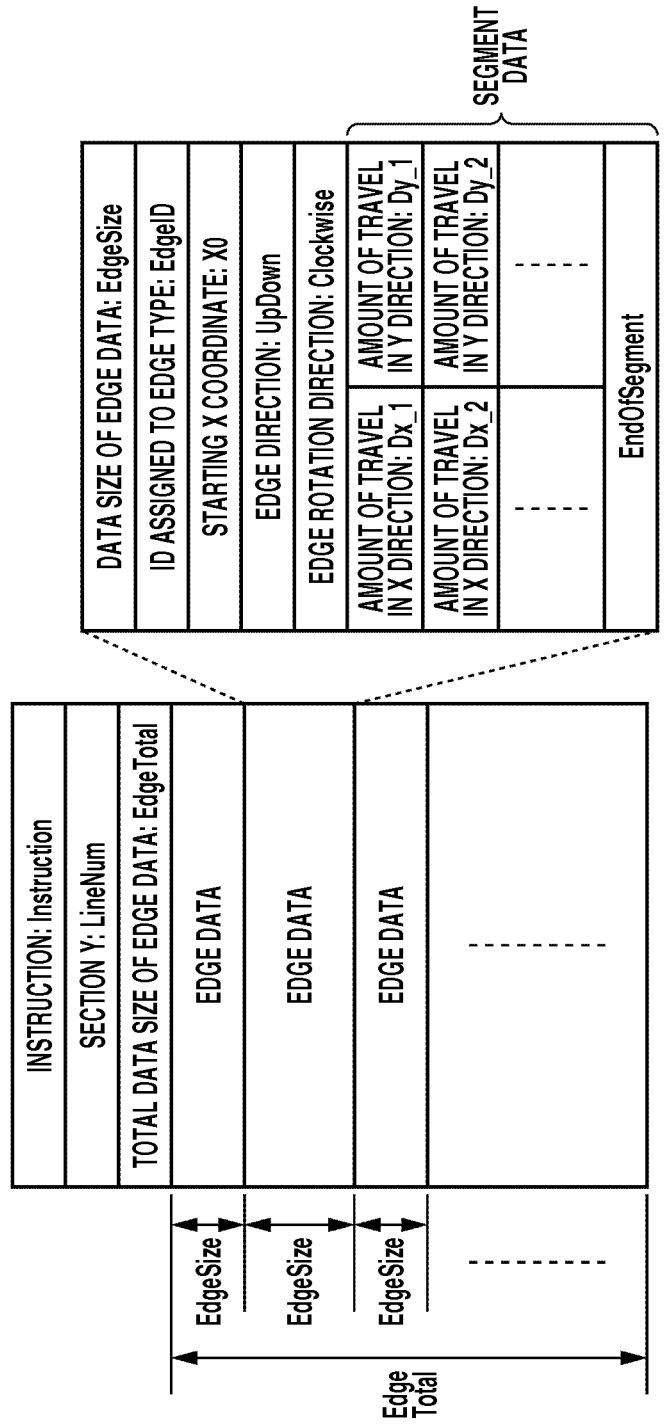
FIG. 5 illustrates an example of intermediate data read by an edge processing unit.

FIG. 5 illustrates an example of intermediate data read by the edge processing unit 301.

"Instruction" presents commands to be executed by the edge processing unit 301. The commands which the edge processing unit 301 executes include "rendering start" and "rendering end". If the edge processing unit 301 reads the "rendering start" command, rendering processing of the edge data of the corresponding scan line is performed. "LineNum" presents the number of scan lines to be processed until Instruction is read from the intermediate data the next time. "EdgeTotal" presents a total data size of the edge data to be rendered by the corresponding scan line. The edge data includes information of each edge. "EdgeSize" presents data size of each piece of edge data. "EdgeID" presents an ID assigned to each edge type. If the edge is a PS edge, an ID indicating PS edge is stored in EdgeID.

"X_0" presents a start X coordinate of the edge. "UpDown" indicates whether the edge direction is upward or downward. "Clockwise" indicates whether the line of the coordinate points, which are the basis of the edge, is transferred to the intermediate data generation processing unit 215 in a clockwise or counterclockwise rotation direction. A travel amount of the edge in the X and Y directions is described in a portion of the segment data. The edge processing unit 301 determines the X coordinate in each scan line based on a travel amount Dx, Dy written in the segment data. "EndOfSegment", which is information indicating the end of the segment data, is provided at the end of the segment data. The edge processing unit 301 detects the end of the edge by reading EndOfSegment. The description of the rendering end command is not given.

Figure 6:
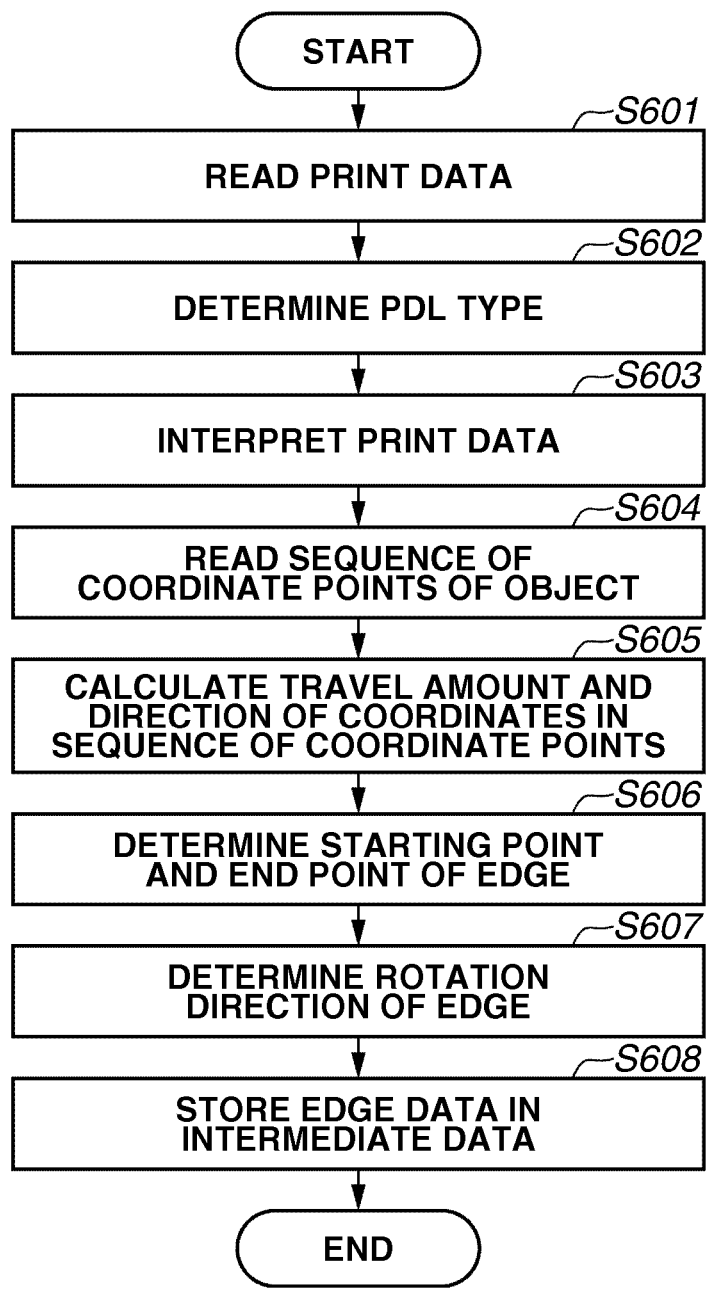
FIG. 6 is a flowchart illustrating information processing used for generating edge data from a sequence of coordinate points.

FIG. 6 is a flowchart illustrating information generation processing of edge data from a sequence of coordinate points.

In step S601, the print data interpretation processing unit 214 reads the print data stored in the print data storage unit 209. In step S602, the print data interpretation processing unit 214 identifies the PDL type from the description at the heading portion of the print data which has been read. Whether the PDL type is PS or not is identified at this point in time. In step S603, the print data interpretation processing unit 214 interprets the print data using the interpretation method provided for each PDL type.

In step S604, the print data interpretation processing unit 214 transfers the sequence of the coordinate points of the object acquired from the print data to the intermediate data generation processing unit 215 and the intermediate data generation processing unit 215 reads the sequence of the coordinate points. In step S605, from the sequence of the coordinate points, the intermediate data generation processing unit 215 calculates the travel amount of the coordinates and whether the travel direction of the coordinates is upward or downward in the Y-axis direction.

In step S606, the intermediate data generation processing unit 215 determines the starting point and the end point of the edge from the travel direction of the coordinates in the Y-axis direction of the sequence of coordinate points. In step S607, the intermediate data generation processing unit 215 determines the rotation direction of the edge from the order the sequence of the coordinate points are read and the X coordinates of the coordinate points a magnitude relation before and after the starting point in the sequence of the coordinate points. In step S608, the intermediate data generation processing unit 215 stores the edge data in the intermediate data storage unit 210.

Figure 7A:
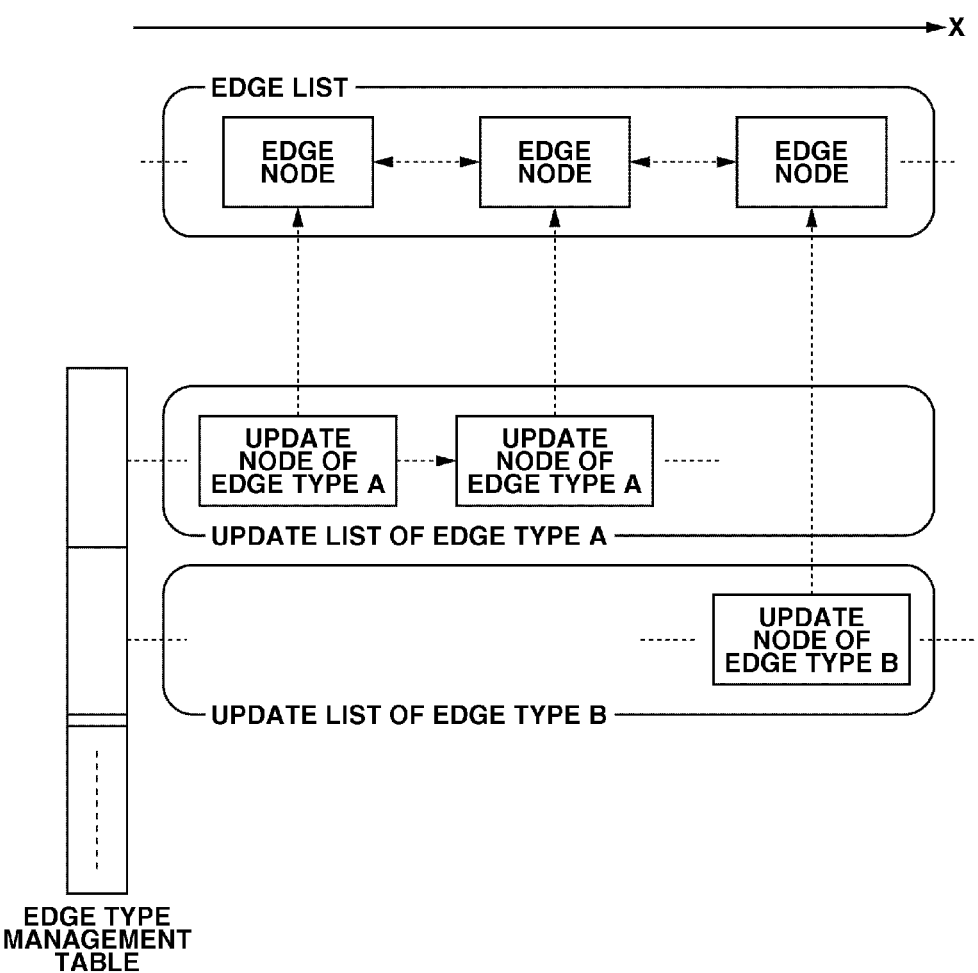
FIG. 7A illustrates an example of data structures of an edge list and an update list.

FIG. 7A illustrates a data structure used by the edge processing unit 301.

The edge processing unit 301 uses an edge list and an update list. Edge nodes in the edge list are linked by a bidirectional pointer. Update nodes for each edge type are included in the update list. The update nodes are determined according to the edge type and are linked by a unidirectional pointer. The edge node includes information of an X coordinate that does not depend on the edge type and information of the edge direction. Further, the edge nodes in the edge list are linked in the ascending order in the X-axis direction so that the positional relation of the edge can be correctly managed. Thus, if the X coordinate of the edge is updated and the positional relation of the edge nodes is changed, the edge nodes are sorted by the bidirectional pointer so that they are in the ascending order in the X-axis direction. The update node includes information necessary in updating the X coordinate that depends on the edge type. The update list manages the update notes for each edge type by linking the update nodes for each edge type.

Since the order of the update nodes does not affect the image output from the rendering processing unit 216, it is not necessary to consider the order of the update nodes in the update list. However, for convenience in description, the update nodes are aligned in the order they are loaded from the intermediate data. The edge list includes a pointer that manages an address of the edge node at the top of the top edge list. Further, a pointer edge type management table, which manages an address of an update node which is at the top, is provided for each edge type so that the update list can be accessed.

Figure 8:
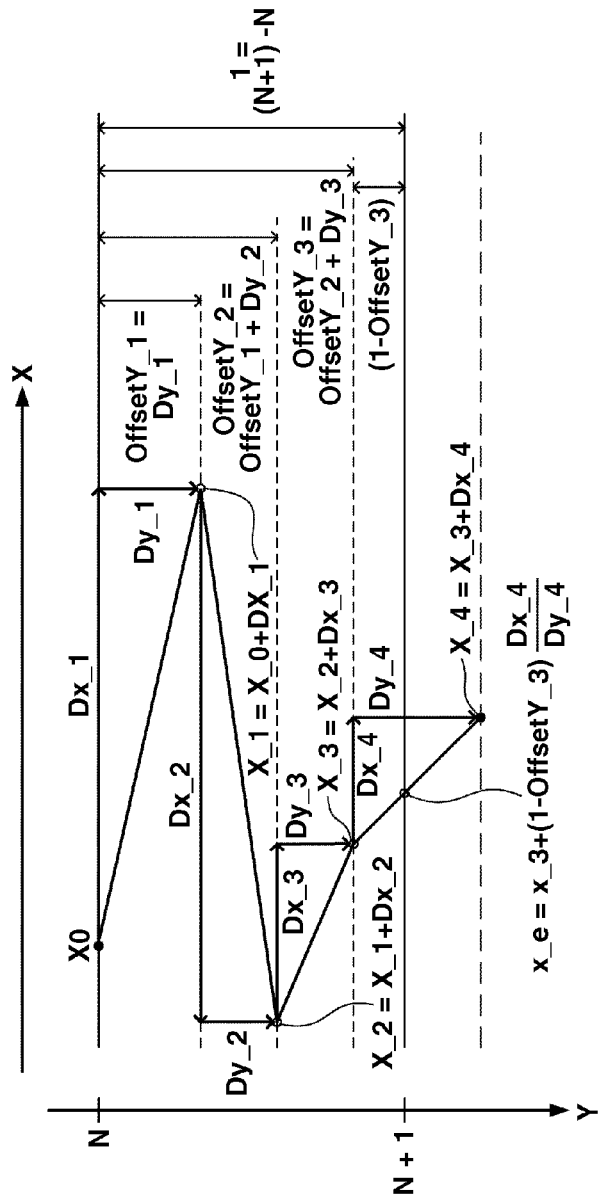
FIG. 8 illustrates a method for determining an X coordinate of a PS edge of each scan line.

FIG. 8 illustrates a method for determining an X coordinate of a PS edge of each scan line.

In the section of N<Y≤(N+1), an X coordinate of a PS edge where Y=N, is a value which is obtained by rounding a minimum X coordinate value to an integer if the edge is a start edge and is a value obtained by rounding a maximum X coordinate value to an integer if the edge is an end edge. In FIG. 8, the PS edge moves to a point X=X_2 according to a travel amount Dx_1, Dy_1 having a point X=X_0 as a starting point where Y=N. Similarly, the PS edge moves to a point X=X_3. From the point X=X_3, the PS edge moves to a point X=X_4 according to a travel amount Dx_4, Dy_4. However, the point X=X_4 exceeds Y=(N+1). Thus, the edge processing unit 301 calculates an X coordinate value X_e of the PS edge where Y=(N+1). Then, the edge processing unit 301 selects X_2 being the minimum value among X={X_1,X_2, X_3,X_e} if the PS edge is the start edge, and selects X_1 being the maximum value if the PS edge is the end edge. The start edge is an edge indicating the start of the filling section of an object. On the other hand, the end edge is an edge indicating the end of the filling section of an object.

According to a first exemplary embodiment, a case where the edge rotation direction of the PS edge is clockwise when the intermediate data generation processing unit 215 receives the sequence of the coordinate points from the print data interpretation processing unit 214 will be described.

Figure 9:
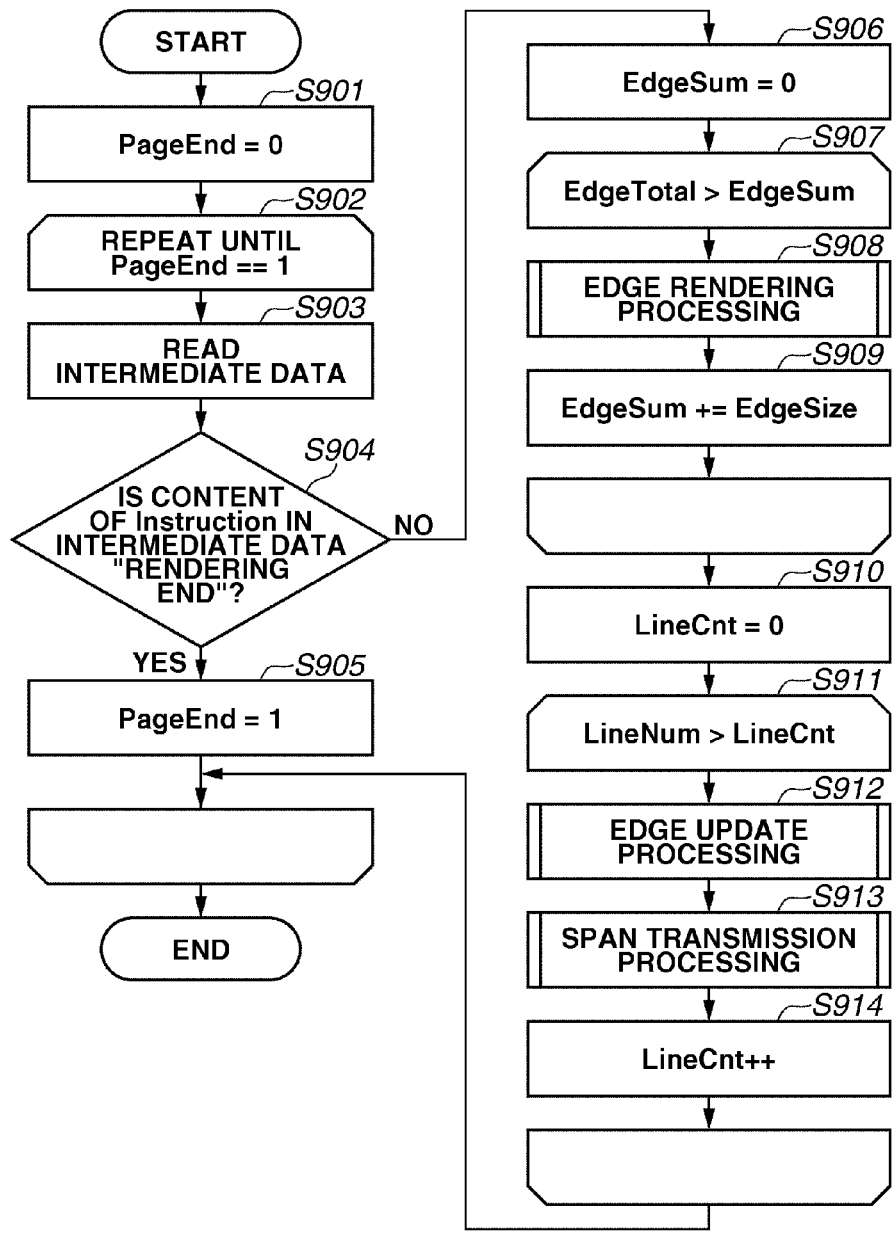
FIG. 9 illustrates processing performed by the edge processing unit.

FIG. 9 illustrates processing of the edge processing unit 301.

In step S901, the edge processing unit 301 writes 0 to PageEnd. In step S902, the edge processing unit 301 repeats the processing which is performed from steps S903 to S914 until PageEnd==1 by loop control. In step S903, the edge processing unit 301 reads the intermediate data stored in the intermediate data storage unit 210.

In step S904, the edge processing unit 301 determines whether the content of Instruction in the intermediate data read in step S903 is "rendering end". If the content of Instruction is "rendering end" (YES in step S904), the processing proceeds to step S905. If the content of Instruction is "rendering start" (NO in step S904), the processing proceeds to step S906. In step S905, the edge processing unit 301 writes 1 to PageEnd.

In step S906, the edge processing unit 301 writes 0 to EdgeSum. In step S907, the edge processing unit 301 repeats the processing in steps S908 and S909 by loop control until EdgeSum is equal to or greater than EdgeTotal being a total size of edge data of the corresponding scan line in the intermediate data.

In step S908, the edge processing unit 301 reads the edge data from the intermediate data and performs edge rendering processing. Details of the edge rendering processing will be described below with reference to FIG. 10. In step S909, the edge processing unit 301 adds the data size of the edge data (EdgeSize) read in step S908 to EdgeSum. In step S910, the edge processing unit 301 writes 0 to LineCnt. In step S911, the edge processing unit 301 repeats the processing in steps S912 to S914 by loop control until LineCnt is equal to or greater than the number of scan lines LineNum after the corresponding scan line in the intermediate data and where rendering of a new edge is necessary.

In step S912, the edge processing unit 301 performs edge update processing. Details of the edge update processing will be described below with reference to FIG. 11. In step S913, the edge processing unit 301 performs transmission processing of the span. Details of the transmission processing of the span will be described below with reference to FIG. 12. In step S914, the edge processing unit 301 adds 1 to LineCnt.

Figure 10:
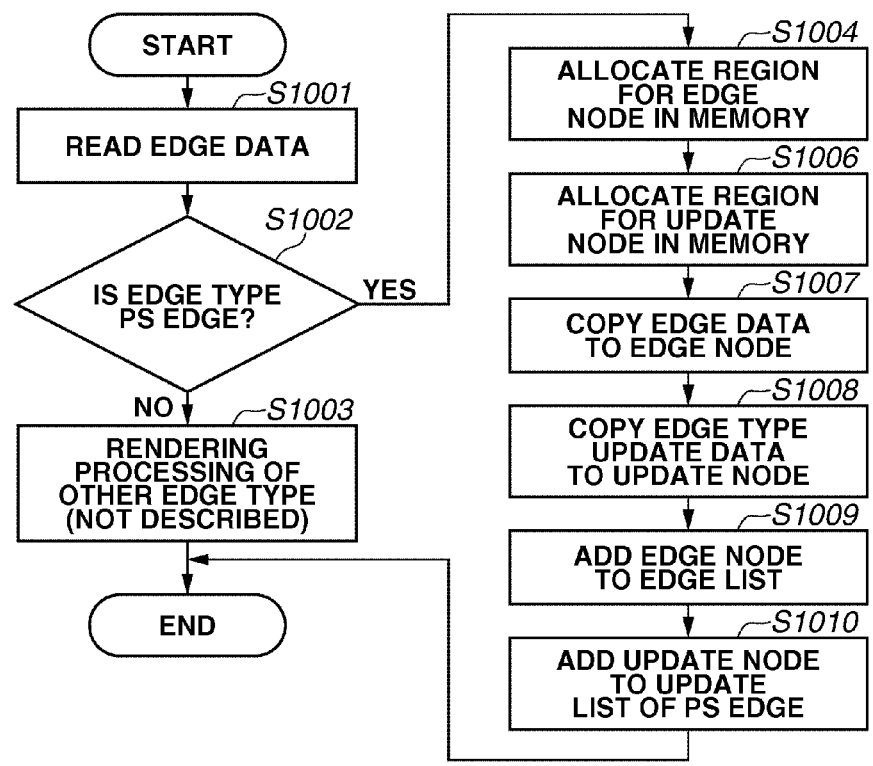
FIG. 10 is a flowchart illustrating rendering processing of an edge.

FIG. 10 is a flowchart illustrating rendering processing of the edge.

In step S1001, the edge processing unit 301 reads edge data from the intermediate data. In step S1002, the edge processing unit 301 determines whether the edge type is PS edge by referencing EdgeID in edge data. If the edge processing unit 301 determines that the edge type is PS edge (YES in step S1002), the processing proceeds to step S1004. If the edge processing unit 301 determines that the edge type is not PS edge (NO in step S1002), the processing proceeds to step S1003. The processing in step S1003 is not described since it is rendering processing of a different edge type and is unrelated to the content of the present embodiment. In step S1004, the edge processing unit 301 reserves a region for the edge node in the memory.

In step S1006, the edge processing unit 301 reserves a region for the update node of the PS edge in the memory. In step S1007, the edge processing unit 301 copies data necessary for the edge node from the edge data to the edge node. To be more precise, the edge processing unit 301 copies X_0 to CurrentX and Direction to UpDown. In step S1008, the edge processing unit 301 copies data necessary for the update node from the edge data to the update node. To be more precise, the edge processing unit 301 copies X_0 to ReX and the start address of the segment data to SegPtr. In step S1009, the edge processing unit 301 newly adds the edge node to the edge list. In step S1010, the edge processing unit 301 performs the registration of the update node in the update list of the PS edge.

Figure 11:
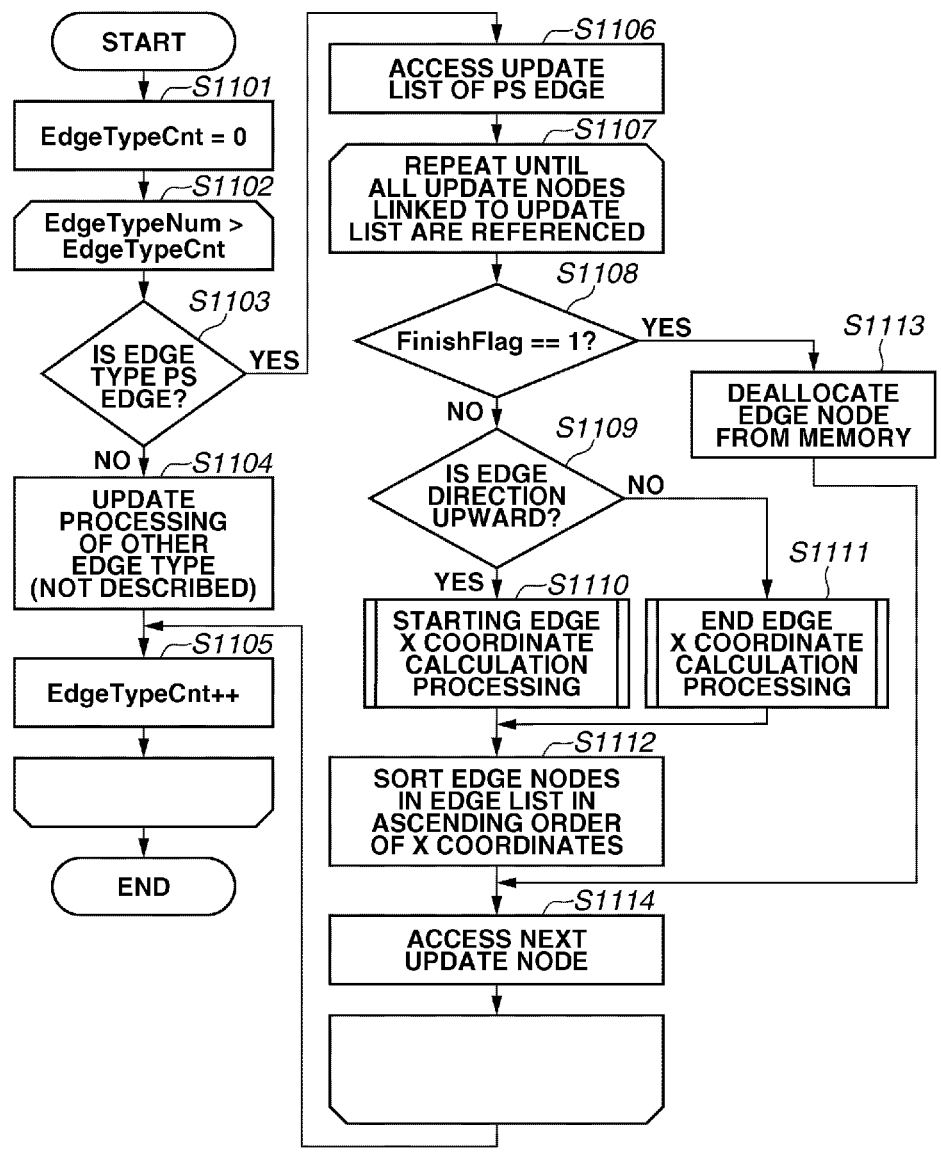
FIG. 11 is a flowchart illustrating update processing of an edge.

FIG. 11 is a flowchart illustrating the edge update processing.

In step S1101, the edge processing unit 301 writes 0 to EdgeTypeCnt. In step S1102, the edge processing unit 301 repeats the processing in steps S1103 and S1114 by loop control until EdgeTypeCnt is equal to or greater than EdgeTypeNum being a total number of the edges for each edge type. In other words, the edge processing unit 301 accesses the update list of each edge type having EdgeID corresponding to a value presented by EdgeTypeCnt and performs edge update processing for each edge type.

In step S1103, the edge processing unit 301 determines whether the edge type is PS edge. If EdgeTypeCnt indicates EdgeID of a PS edge (YES in step S1103), the processing proceeds to step S1106. If EdgeTypeCnt does not indicate EdgeID of a PS edge (NO in step S1103), the processing proceeds to step S1104. The processing in step S1104 is not described since it is update processing of a different edge type and is unrelated to the content of the present embodiment.

In step S1105, the edge processing unit 301 adds 1 to EdgeTypeCnt. In step S1106, the edge processing unit 301 accesses the update list of the PS edge. In step S1107, the edge processing unit 301 repeats the processing in step S1108 to S1114 by loop control until all the update nodes linked to the update list of the PS edge are accessed. In step S1108, the edge processing unit 301 determines whether the value of FinishFlag of the update node is 1. If the edge processing unit 301 determines that the value of FinishFlag is 1 (YES in step S1108), the processing proceeds to step S1113. If the edge processing unit 301 determines that the value of FinishFlag is not 1 (NO in step S1108), the processing proceeds to step S1109.

In step S1109, the edge processing unit 301 references corresponding edge node from EdgePtr, references UpDown, and determines whether the edge direction is upward. If the edge processing unit 301 determines that the edge direction is upward (YES in step S1109), the edge is determined as a start edge, and the processing proceeds to step S1110. On the other hand, if the edge processing unit 301 determines that the edge direction is downward (NO in step S1109), the edge is determined as an end edge, and the processing proceeds to step S1111.

In step S1110, the edge processing unit 301 calculates the X coordinate of the start edge of the PS edge. The processing in step S1110 is an example of determining the X coordinate of the edge to be determined for each scan line as the minimum value of the corresponding scan line (starting coordinate determination processing). Details of the processing in step S1110 will be described below with reference to FIG. 12.

In step S1111, the edge processing unit 301 calculates the X coordinate of the end edge of the PS edge. The processing in step S1111 is an example of determining the X coordinate of the edge to be determined for each scan line as the maximum value of the corresponding scan line (end coordinate determination processing). Details of the processing in step S1111 will be described below with reference to FIG. 13. In step S1112, the edge processing unit 301 sorts the edge nodes in the edge list so that the edge node can be set to an appropriate link position in accordance with CurrentX updated in step S1110 or S1111. In sorting the edge nodes in the edge list, the edge processing unit 301 uses the value of CurrentX as a key value.

In step S1113, the edge processing unit 301 removes the edge node from the edge list and the update node from the update list, and deallocates the edge node and the update node from the memory. In step S1114, the edge processing unit 301 accesses the next update node by referencing NextPtr.

Figure 12:
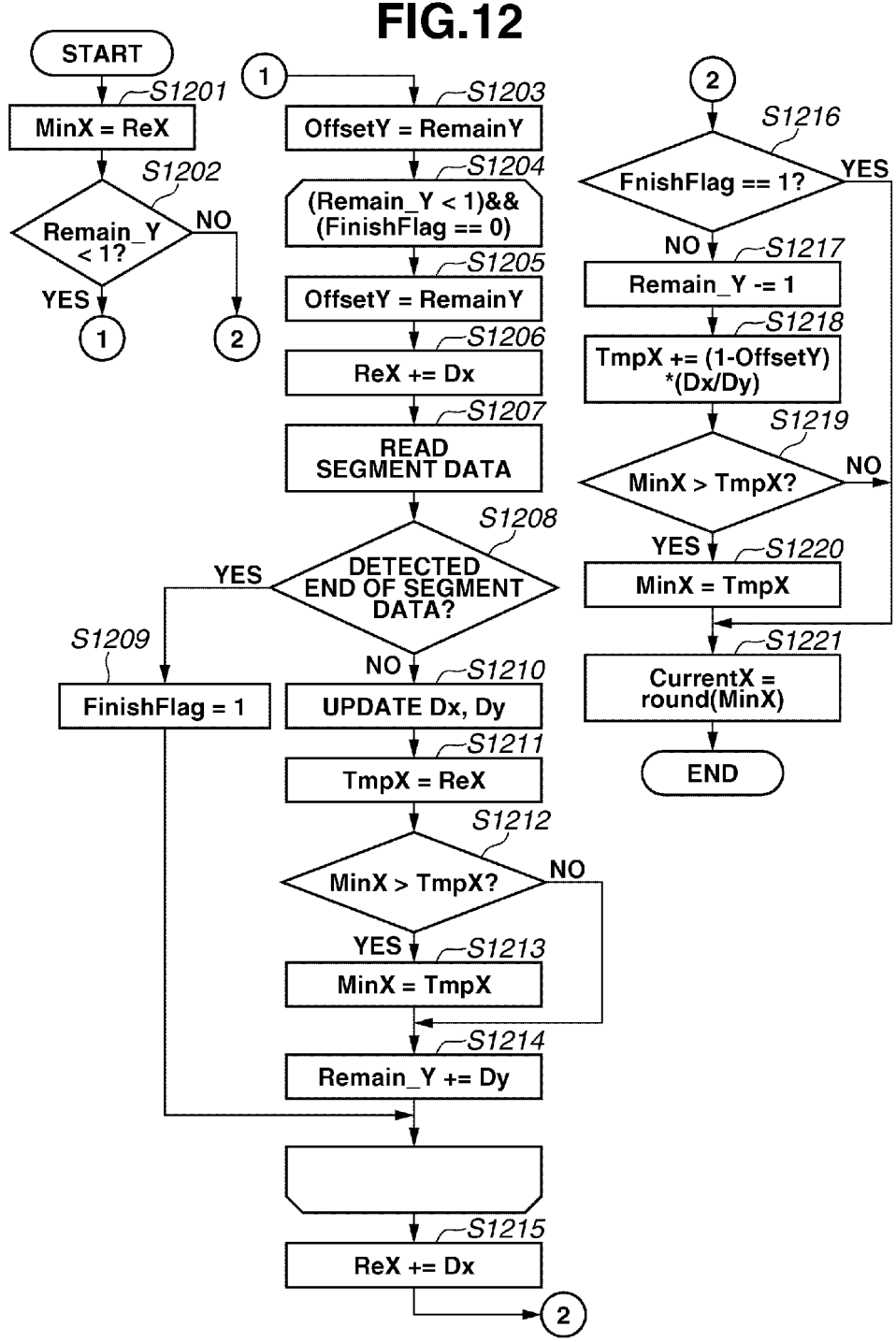
FIG. 12 is a flowchart illustrating information update processing of an X coordinate of a start edge.

FIG. 12 is a flowchart illustrating information processing used for updating X coordinate of the start edge.

In step S1201, the edge processing unit 301 writes the value of ReX to MinX. In step S1202, the edge processing unit 301 determines whether RemainY is smaller than 1. If the edge processing unit 301 determines that RemainY is smaller than 1 (YES in step S1201), the processing proceeds to step S1203. If the edge processing unit 301 determines that RemainY is 1 or greater (NO in step S1201), the processing proceeds to step S1216. In step S1203, the edge processing unit 301 writes the value of RemainY to OffsetY. In step S1204, the edge processing unit 301 repeats the processing in step S1205 to S1214 until RemainY is 1 or greater in loop control or 1 is written to FinishFlag.

In step S1205, the edge processing unit 301 writes the value of RemainY to OffsetY. In step S1206, the edge processing unit 301 adds Dx to ReX. In step S1207, the edge processing unit 301 reads segment data by moving SegPtr.

In step S1208, the edge processing unit 301 determines whether EndOfSegment is read in step S1207. If the edge processing unit 301 determines that EndOfSegment is read in step S1207 (YES in step S1208), the processing proceeds to step S1209. If the edge processing unit 301 determines that EndOfSegment is not yet read in step S1207 (NO in step S1208), the processing proceeds to step S1210. In step S1209, the edge processing unit 301 sets the value of FinishFlag to 1. In step S1210, the edge processing unit 301 updates Dx, Dy of the update node to new Dx, Dy stored in the segment data. In step S1211, the edge processing unit 301 writes the value of ReX to TmpX.

In step S1212, the edge processing unit 301 compares MinX and TmpX. If the edge processing unit 301 determines that MinX is larger (YES in step S1212), the processing proceeds to step S1213. If the edge processing unit 301 determines that MinX is not larger (NO in step S1212), the processing proceeds to step S1214. In step S1213, the edge processing unit 301 writes the value of TmpX to MinX. In step S1214, the edge processing unit 301 adds the value of Dy to RemainY.

In step S1215, the edge processing unit 301 adds the value of Dx to ReX. In step S1216, the edge processing unit 301 determines whether the value of FinishFlag is 1 or not. If the edge processing unit 301 determines that the value of FinishFlag is 1 (YES in step S1216), the processing proceeds to step S1221. If the edge processing unit 301 determines that the value of FinishFlag is not 1 (NO in step S1216), the processing proceeds to step S1217. In step S1217, the edge processing unit 301 subtracts 1 from the value of RemainY. In step S1218, the edge processing unit 301 calculates the intersection of the edge and the scan line and the X coordinate and writes them to TmpX.

In step S1219, the edge processing unit 301 compares MinX and TmpX. If the edge processing unit 301 determines that MinX is larger (YES in step S1219), the processing proceeds to step S1220. If the edge processing unit 301 determines that MinX is not larger (NO in step S1219), the processing proceeds to step S1221. In step S1220, the edge processing unit 301 writes the value of TmpX to MinX. In step S1221, the edge processing unit 301 rounds the value of MinX to an integer and writes it to CurrentX. The rounding method to an integer can be rounding up, rounding down, or rounding off the digit right of the decimal point.

Figure 13:
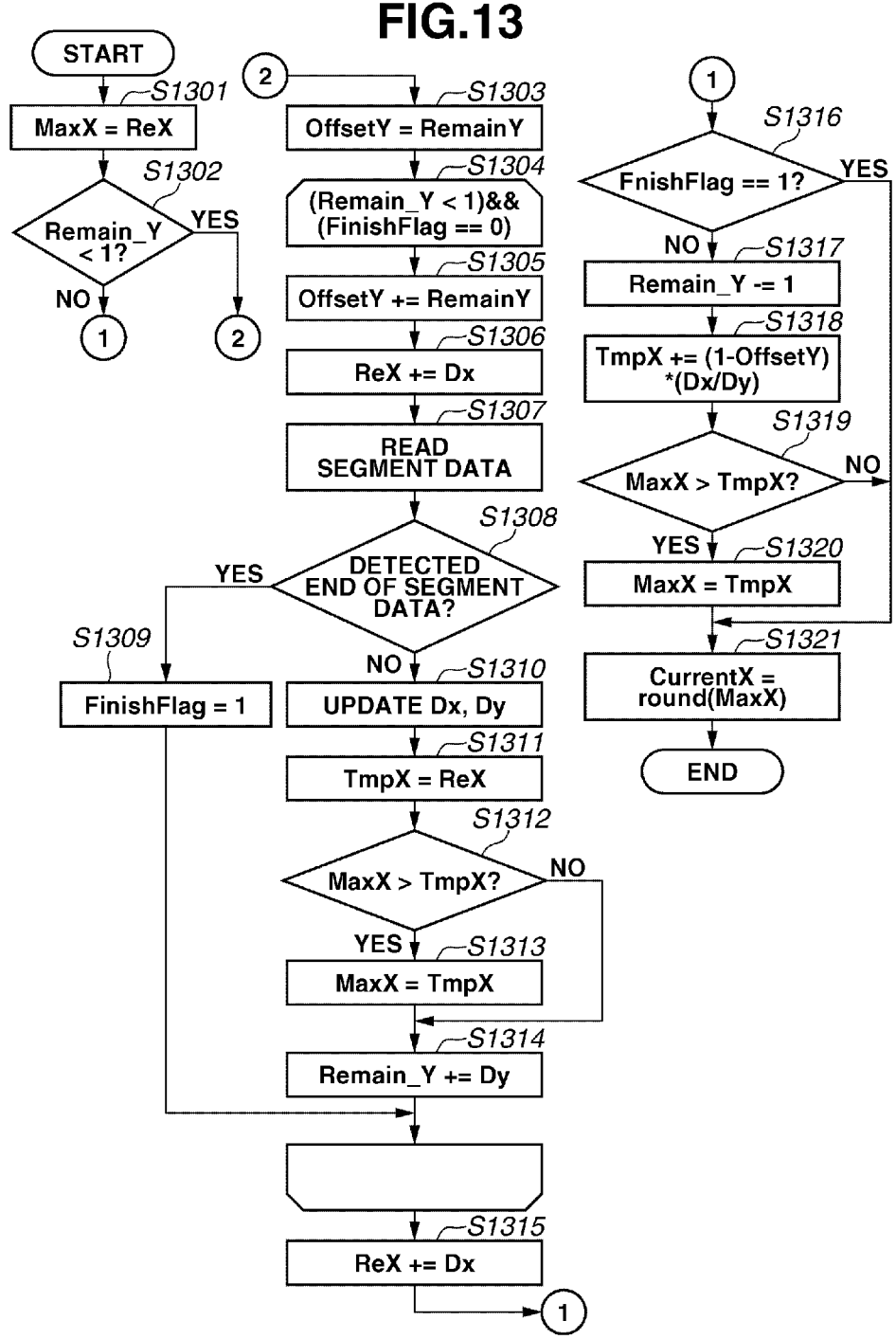
FIG. 13 is a flowchart illustrating information update processing of an X coordinate of an end edge.

FIG. 13 is a flowchart illustrating information processing used for updating X coordinate of end edge.

In step S1301, the edge processing unit 301 writes the value of ReX to MaxX. In step S1302, the edge processing unit 301 determines whether RemainY is smaller than 1. If the edge processing unit 301 determines that RemainY is smaller than 1 (YES in step S1302), the processing proceeds to step S1303. If the edge processing unit 301 determines that RemainY is 1 or greater (NO in step S1302), the processing proceeds to step S1316. In step S1303, the edge processing unit 301 writes the value of RemainY to OffsetY.

In step S1304, the edge processing unit 301 repeats the processing in step S1305 to S1314 until RemainY is 1 or greater in the loop control or 1 is written in FinishFlag. In step S1305, the edge processing unit 301 writes the value of RemainY to OffsetY. In step S1306, the edge processing unit 301 adds Dx to ReX. In step S1307, the edge processing unit 301 reads segment data by moving SegPtr.

In step S1308, the edge processing unit 301 determines whether EndOfSegment is read in step S1307. If the edge processing unit 301 determines that EndOfSegment is read in step S1307 (YES in step S1308), the processing proceeds to step S1309. If the edge processing unit 301 determines that EndOfSegment is not yet read in step S1307 (NO in step S1308), the processing proceeds to step S1310. In step S1309, the edge processing unit 301 sets the value of FinishFlag to 1. In step S1310, the edge processing unit 301 updates Dx, Dy in the update node to new Dx, Dy stored in the segment data. In step S1311, the edge processing unit 301 writes the value of ReX to TmpX.

In step S1312, the edge processing unit 301 compares TmpX and MaxX. If the edge processing unit 301 determines that TmpX is larger than MaxX (YES in step S1312), the processing proceeds to step S1313. If the edge processing unit 301 determines that TmpX is not larger than MaxX (NO in step S1312), the processing proceeds to step S1314. In step S1313, the edge processing unit 301 writes the value of TmpX to MaxX. In step S1314, the edge processing unit 301 adds the value of Dy to RemainY.

In step S1315, the edge processing unit 301 adds the value of Dx to ReX. In step S1316, the edge processing unit 301 determines whether the value of FinishFlag is 1. If the edge processing unit 301 determines that the value of FinishFlag is 1 (YES in step S1316), the processing proceeds to step S1321. If the edge processing unit 301 determines that the value of FinishFlag is not 1 (NO in step S1316), the processing proceeds to step S1317. In step S1317, the edge processing unit 301 subtracts 1 from the value of RemainY.

In step S1318, the edge processing unit 301 calculates the intersection of the edge and the scan line, and the X coordinate and writes them to TmpX. In step S1319, the edge processing unit 301 compares MaxX and TmpX. If the edge processing unit 301 determines that MaxX is smaller (YES in step S1319), the processing proceeds to step S1320. If the edge processing unit 301 determines that MaxX is not smaller (NO in step S1319), the processing proceeds to step S1321. In step S1320, the edge processing unit 301 writes the value of TmpX to MaxX. In step S1321, the edge processing unit 301 rounds the value of MaxX to an integer and writes it to CurrentX. The rounding method to an integer can be rounding up, rounding down, or rounding off the digit right of the decimal point.

Figure 14:
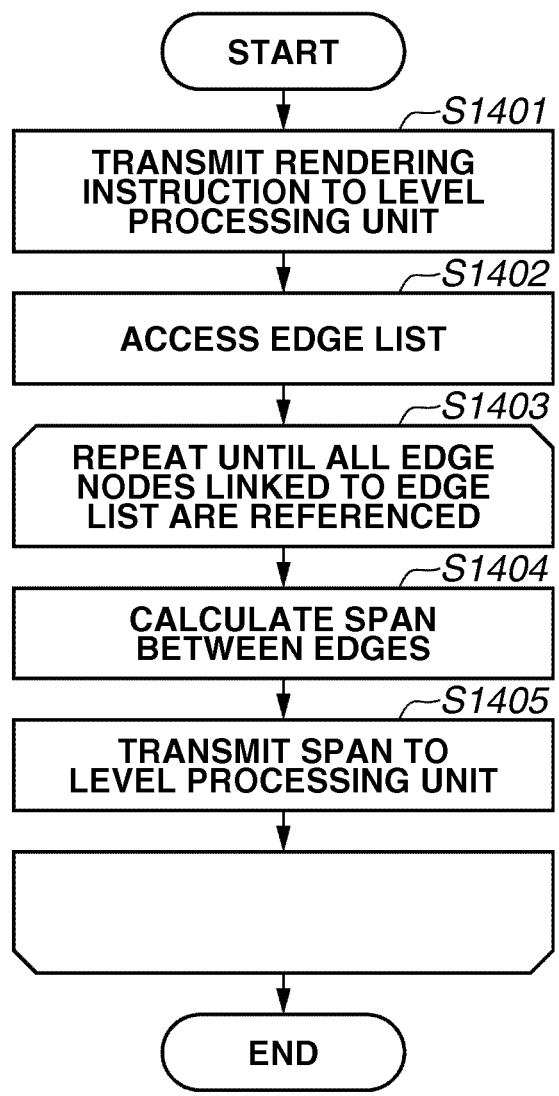
FIG. 14 is a flowchart illustrating span transmission processing.

FIG. 14 is a flowchart illustrating span transmission processing.

In step S1401, the edge processing unit 301 transmits a rendering instruction to the level processing unit 302 to notify the level processing unit 302 that the span of the corresponding scan line (section between edges) will be transmitted. In step S1402, the edge processing unit 301 accesses an edge list using a pointer. In step S1403, the edge processing unit 301 repeats steps S1404 to S1405 by loop control until all the edge nodes linked to the edge list are accessed.

In step S1404, the edge processing unit 301 calculates the span which is a difference between an X coordinate value (CurrentX) of the edge node which is currently being focused and CurrentX of the edge node which is linked next. In step S1405, the edge processing unit 301 transmits the span to the level processing unit 302.

According to a second exemplary embodiment, a case where the edge rotation direction of the PS edge is not uniformly clockwise when the intermediate data generation processing unit 215 receives the sequence of the coordinate points from the print data interpretation processing unit 214 will be described. In this case, since processing other than the edge update processing is similar, only the edge update processing will be described.

Figure 15:
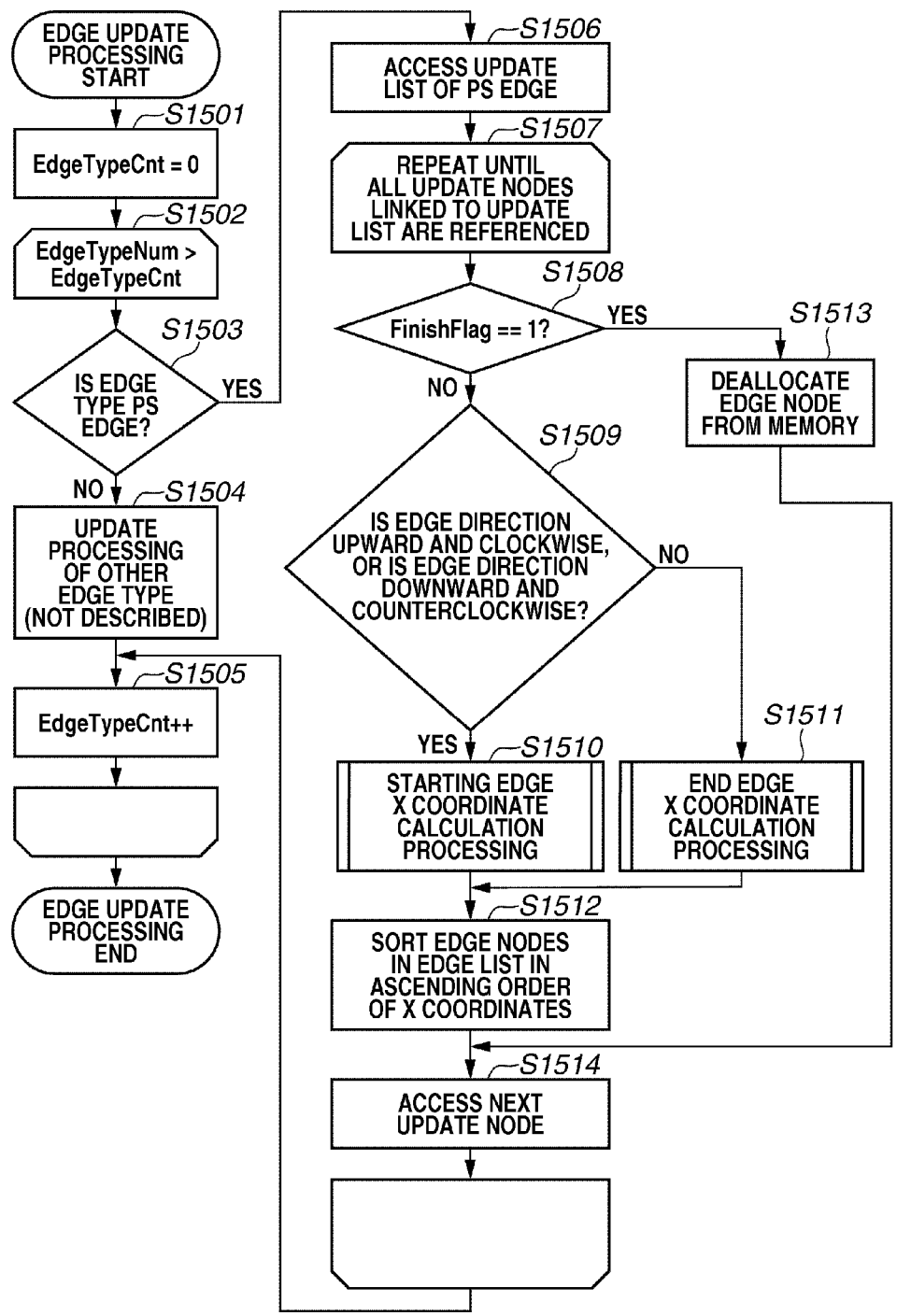
FIG. 15 is a flowchart illustrating edge update processing.

FIG. 15 is a flowchart illustrating the edge update processing.

In step S1501, the edge processing unit 301 writes 0 to EdgeTypeCnt. In step S1502, the edge processing unit 301 repeats the processing insteps S1503 and S1514 by loop control until EdgeTypeCnt is equal to or greater than EdgeTypeNum being a total number of the edges for each edge type. In other words, the edge processing unit 301 accesses the update list of each edge type having EdgeID corresponding to a value presented by EdgeTypeCnt and performs edge update processing for each edge type. In step S1503, the edge processing unit 301 determines whether the edge type is PS edge. If EdgeTypeCnt indicates EdgeID of PS edge (YES in step S1503), the processing proceeds to step S1506. If EdgeTypeCnt does not indicate EdgeID of PS edge (NO in step S1503), the processing proceeds to step S1504.

The processing in step S1504 is not described since it is update processing of a different edge type and is unrelated to the content of the present embodiment. In step S1505, the edge processing unit 301 adds 1 to EdgeTypeCnt.

In step S1506, the edge processing unit 301 accesses the update list of the PS edge. In step S1507, the edge processing unit 301 repeats the processing in step S1508 to S1514 by loop control until all the update nodes linked to the update list of the PS edge are accessed. In step S1508, the edge processing unit 301 determines whether the value of FinishFlag of the update node is 1. If the edge processing unit 301 determines that the value of FinishFlag is 1 (YES in step S1508), the processing proceeds to step S1513. If the edge processing unit 301 determines that the value of FinishFlag is not 1 (NO in step S1508), the processing proceeds to step S1509.

In step S1509, the edge processing unit 301 references the corresponding edge node from Clock and EdgePtr and references UpDown. The edge processing unit 301 determines whether the rotation direction of the edge is clockwise and the edge direction is upward, or the rotation direction of the edge is counterclockwise and the edge direction is downward, from Clock and UpDown. If the edge processing unit 301 determines that the rotation direction is clockwise and the edge direction is upward or the rotation direction is counterclockwise and the edge direction is downward (YES in step S1509), the edge processing unit 301 determines that the edge is a start edge and the processing proceeds to step S1510. If the edge processing unit 301 determines that the rotation direction and the edge direction are not those described above (NO in step S1509), the edge processing unit 301 determines that the edge is an end edge and the processing proceeds to step S1511. In step S1510, the edge processing unit 301 calculates the X coordinate of the start edge of the PS edge. In step S1511, the edge processing unit 301 calculates the X coordinate of the end edge of the PS edge.

In step S1512, the edge processing unit 301 sorts the edge nodes in the edge list so that the edge node can be set to an appropriate link position in accordance with CurrentX updated in step S1510 or S1511. In sorting the edge nodes in the edge list, the edge processing unit 301 uses the value of CurrentX as a key value. In step S1513, the edge processing unit 301 removes the edge node from the edge list and the update node from the update list, and deallocates the edge node and the update node from the memory. In step S1514, the edge processing unit 301 accesses the next update node by referencing NextPtr.

FIGS. 16A and 16B illustrate the effect of the present embodiment.

FIG. 16A illustrates a portion of the data structure of the conventional PS edge. Further, FIG. 16B illustrates a portion of a data structure of a PS edge according to each of the above-described exemplary embodiments. According to the conventional technique illustrated in FIG. 16A, an edge node having a maximum and a minimum X coordinates at the start edge and the end edge are necessary. Thus, four edges are necessary even for one object which does not have any overlapping areas with another object. On the other hand, according to FIG. 16B, by each of the above-described exemplary embodiments, one edge node is necessary for the start edge and the end edge. Thus, only two edges are necessary for one object having no overlapping areas with another object. Thus, if the data includes only PS edges, the number of the PS edges can be reduced to half according to the present embodiment.

According to the above-described exemplary embodiments, the number of edges to be processed by the rendering processing unit of PS data of a graphic art has been reduced from 1,487,118 to 817,402, the rendering processing time has been reduced from 75 seconds to 45 seconds, and the speed has been increased to 1.6 times.

According to the above-described each exemplary embodiment, reduction in performance of image forming can be prevented.

The present invention is not limited to the above-described exemplary embodiments, and various changes and modifications can be applied so long as they fall within the scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-268272, filed Dec. 7, 2011, which is hereby incorporated by reference herein in its entirety.

What is claimed is:

1. An image processing apparatus comprising:
a reading unit configured to read an edge of an object from intermediate data generated from page description language data;
a determination unit configured to determine whether the read edge is a start edge or an end edge on a basis of an edge direction of the read edge, the start edge indicating X coordinates from which a filling section of the object starts and the end edge indicating X coordinates at which the filling section of the object ends;
a starting coordinate determination unit configured to calculate, if the read edge is determined as the start edge by the determination unit and the read edge has a plurality of segments along a Y coordinate direction on a current scan line, a plurality of X coordinate values for the read edge on the current scan line on the on a basis of a plurality of travel amounts of the plurality of the segments to determine a minimum one of the plurality of the calculated X coordinates as an X coordinate value of the read edge on the current scan line;
an end coordinate determination unit configured to calculate, if the read edge is determined as the end edge by the determination unit and the read edge has a plurality of segments along the Y coordinate direction on a current scan line, a plurality of X coordinate values for the read edge on the current scan line on a basis of a plurality of travel amounts of the plurality of the segments to determine a maximum one of the plurality of the calculated X coordinates as an X coordinate value of the read edge on the current scan line; and
a filling unit configured to perform a filling process of a filling section on the current scan line on a basis of the X coordinate value of the read edge on the current scan line determined by the starting coordinate determination unit or the end coordinate determination unit.

2. The image forming apparatus according to claim 1, wherein the determination unit determines that the read edge is the start edge if the edge direction of the read edge is upward, and the determination unit determines that the read edge is the end edge if the edge direction of the read edge is downward.

3. The image processing apparatus according to claim 1, wherein the page description language data is print data described in PostScript language.

4. A method for an image process in an image processing apparatus, comprising:
reading an edge of an object from intermediate data generated from page description language data;
determining whether the read edge is a start edge or an end edge on a basis of an edge direction of the read edge, the start edge indicating X coordinates from which a filling section of the object starts and the end edge indicating X coordinates at which the filling section of the object ends;
calculating, if the read edge is determined as the start edge by the determination and the read edge has a plurality of segments along a Y coordinate direction on a current scan line, a plurality of X coordinate values for the read edge on the current scan line on a basis of a plurality of travel amounts of the plurality of the segments to determine a minimum one of the plurality of the calculated X coordinates as an X coordinate value of the read edge on the current scan line;
calculating, if the read edge is determined as the end edge by the determination and the read edge has a plurality of segments along the Y coordinate direction on a current scan line, a plurality of X coordinate values for the read edge on the current scan line on a basis of a plurality of travel amounts of the plurality of the segments to determine a maximum one of the plurality of the calculated X coordinates as an X coordinate value of the read edge on the current scan line; and
performing a filling process of a filling section on the current scan line on a basis of the determined X coordinate value of the read edge on the current scan line.

5. The method according to claim 4, wherein the read edge is determined to be the start edge if the edge direction of the read edge is upward, and the read edge is determined to be the end edge if the edge direction of the read edge is downward.

6. The method according to claim 4, wherein the page description language data is print data described in PostScript language.

7. A non-transitory computer readable medium storing a program which causes a computer to execute an image processing method, the method comprising:
reading an edge of an object from intermediate data generated from page description language data;
determining whether the read edge is a start edge or an end edge on a basis of an edge direction of the read edge, the start edge indicating X coordinates from which a filling section of the object starts and the end edge indicating X coordinates at which the filling section of the object ends;
calculating, if the read edge is determined as the start edge by the determination and the read edge has a plurality of segments along a Y coordinate direction on a current scan line, a plurality of X coordinate values for the read edge on the current scan line on a basis of a plurality of travel amounts of the plurality of the segments to determine a minimum one of the plurality of the calculated X coordinates as an X coordinate value of the read edge on the current scan line;
calculating, if the read edge is determined as the end edge by the determination and the read edge has a plurality of segments along the Y coordinate direction on a current scan line, a plurality of X coordinate values for the read edge on the current scan line on a basis of a plurality of travel amounts of the plurality of the segments to determine a maximum one of the plurality of the calculated X coordinates as an X coordinate value of the read edge on the current scan line; and
performing a filling process of a filling section on the current scan line on a basis of the determined X coordinate value of the read edge on the current scan line.

8. The non-transitory computer readable medium according to claim 7, wherein the read edge is determined to be the start edge if the edge direction of the read edge is upward, and the read edge is determined to be the end edge if the edge direction of the read edge is downward.

9. The non-transitory computer readable medium according to claim 7, wherein the page description language data is print data described in PostScript language.

* * * * *